US010595334B2

(12) United States Patent
Lee et al.

(10) Patent No.: US 10,595,334 B2
(45) **Date of Patent: *Mar. 17, 2020**

(54) METHOD FOR TRANSMITTING UPLINK CONTROL CHANNEL IN WIRELESS COMMUNICATION SYSTEM AND DEVICE THEREFOR

(71) Applicant: LG ELECTRONICS INC., Seoul (KR)

(72) Inventors: Hyunho Lee, Seoul (KR); Yunjung Yi, Seoul (KR); Eunsun Kim, Seoul (KR); Suckchel Yang, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,513

(22) Filed: May 13, 2019

(65) Prior Publication Data

US 2019/0268929 A1 Aug. 29, 2019

Related U.S. Application Data

(63) Continuation of application No. 15/766,554, filed as application No. PCT/KR2016/012146 on Oct. 27, 2016, now Pat. No. 10,362,595.

(Continued)

(51) Int. Cl.

*H04W 72/12* (2009.01)
*H04L 5/00* (2006.01)

(Continued)

(52) U.S. Cl.

CPC ....... *H04W 72/1284* (2013.01); *H04L 1/1812* (2013.01); *H04L 5/00* (2013.01);

(Continued)

(58) Field of Classification Search

CPC ............. H04W 72/0446; H04W 72/12; H04W 72/1284; H04W 74/00; H04L 5/0055; H04L 5/14; H04L 1/1812

See application file for complete search history.

(56) References Cited

U.S. PATENT DOCUMENTS

2014/0071954 A1 3/2014 Au et al.
2014/0226607 A1 8/2014 Holma et al.

(Continued)

FOREIGN PATENT DOCUMENTS

EP 3393057 A1 10/2018
WO 2006105005 A2 10/2006

(Continued)

OTHER PUBLICATIONS

R2-154296: 3GPP TSG-RAN WG2 Meeting #91bis, Malmo, Sweden, Oct. 5-9, 2015, Intel Corporation, "Protocol impact of TTI reduction," pp. 1-5.

(Continued)

*Primary Examiner* — Michael Thier
*Assistant Examiner* — Brian P Cox
(74) *Attorney, Agent, or Firm* — Dentons US LLP

(57) ABSTRACT

A method for transmitting an uplink control channel for a terminal configured to support multiple transmission time interval (TTI) lengths in a wireless communication system according to an embodiment of the present invention is performed by the terminal and may comprises the steps of: receiving a first physical downlink shared channel (PDSCH) according to a first TTI length at a first time point; receiving a second PDSCH according to a second TTI length differing from the first TTI length at a second time point; and when TTIs for transmitting uplink control channels for the received first PDSCH and second PDSCH overlap, transmitting uplink control information for the first PDSCH and (Continued)

second PDSCH on a physical uplink control channel (PUCCH) having the shorter TTI length among the first TTI length and the second TTI length.

19 Claims, 10 Drawing Sheets

Related U.S. Application Data

(60) Provisional application No. 62/250,439, filed on Nov. 3, 2015.

(51) Int. Cl.
*H04W 72/04* (2009.01)
*H04W 74/00* (2009.01)
*H04L 1/18* (2006.01)
*H04L 5/14* (2006.01)

(52) U.S. Cl.
CPC ....... *H04L 5/0055* (2013.01); *H04W 72/0446* (2013.01); *H04W 72/12* (2013.01); *H04W 74/00* (2013.01); *H04L 5/14* (2013.01)

(56) References Cited

U.S. PATENT DOCUMENTS

2016/0095137 A1 3/2016 Chen et al.
2016/0219560 A1* 7/2016 Chen ................... H04W 72/042
2017/0041103 A1* 2/2017 Maattanen ............ H04L 1/1671
2017/0290008 A1* 10/2017 Tooher .................. H04L 1/0007
2018/0324834 A1* 11/2018 Sebire ........................ H04L 5/14

FOREIGN PATENT DOCUMENTS

WO 2014124164 8/2014
WO 2014124164 A1 8/2014

OTHER PUBLICATIONS

R2-154740: 3GPP TSG-RAN WG2 #91bis, Malmo, Sweden, Oct. 5-9, 2015, Ericsson, "Study of shorter TTI for latency reduction," pp. 1-8.

Intel Corporation, "Protocol Impact of TTI Reduction," R2-154296, 3GPP TSG-RAN WG2 Meeting #91bis, Malmo, Sweden, Sep. 26, 2015, see sections 2-2.2.

Ericsson, "Study of Shorter TTI for Latency Reduction," R2-154740, 3GPP TSG-RAN WG2 Meeting #91bis, Malmo, Sweden, Sep. 26, 2015, see sections 2-3.1.

R2-154563: XP051005097—3GPP TSG-RAN WG2 Meeting #91bis, Malmo, Sweden, Oct. 5-9, 2015, "Consideration on Heterogeneous TTIs in a Carrier," ETRI, pp. 1-5.

R1-1609212: XP051159325—3GPP TSG-RAN WG2 Meeting #91bis, Lisbon, Portugal, Oct. 10-14, 2016, "Discussion on shortened processing time for FS2," LG Electronics, pp. 1-5.

* cited by examiner

METHOD FOR TRANSMITTING UPLINK CONTROL CHANNEL IN WIRELESS COMMUNICATION SYSTEM AND DEVICE THEREFOR

This application is a continuation of U.S. patent application Ser. No. 15/766,554, filed on Apr. 6, 2018, which is a National Stage Application of International Application No. PCT/KR2016/012146, filed on Oct. 27, 2016, which claims the benefit of U.S. Provisional Application No. 62/250,439, filed on Nov. 3, 2015, all of which are hereby incorporated by reference in their entirety for all purposes as if fully set forth herein.

TECHNICAL FIELD

The present invention relates to a wireless communication system, and more particularly, to a method of transmitting an uplink control channel in a wireless communication system and an apparatus therefor.

BACKGROUND ART

In a wireless cellular communication system, discussion on a method of performing transmission and reception capable of reducing latency as much as possible by transmitting data as soon as possible during a short time period using a short TTI (transmission time interval) for a service/UE sensitive to latency and transmitting a response within short time in response to the data is in progress. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI. The present invention proposes a method of transmitting control information and a data signal for enabling the abovementioned operation and a multiplexing method.

DISCLOSURE OF THE INVENTION

Technical Task

A technical task of the present invention is to provide a method of transmitting an uplink control channel in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting an uplink control channel for a terminal configured to support multiple TTI (transmission time interval) lengths in a wireless communication system, includes receiving a first PDSCH (physical downlink shared channel) based on a first TTI length at first timing, receiving a second PDSCH based on a second TTI length different from the first TTI length at second timing, and when a TTI for transmitting an uplink control channel for the received first PDSCH is overlapped with a TTI for transmitting an uplink control channel for the second PDSCH, transmitting uplink control information for the first PDSCH and the second PDSCH on a PUCCH (physical uplink control channel) having a shorter TTI length among the first TTI length and the second TTI length.

Additionally or alternatively, the PUCCH may be transmitted in a shorter TTI among TTIs for transmitting an uplink control channel for the first PDSCH or the second PDSCH.

Additionally or alternatively, the PUCCH may be transmitted in a TTI for transmitting a predetermined uplink control channel.

Additionally or alternatively, when a TTI for transmitting an uplink control channel for a third PDSCH is overlapped with the TTI for transmitting the uplink control channel for the first PDSCH and the second PDSCH, the method may further include transmitting an uplink control channel for a PDSCH based on a longest TTI among the first PDSCH, the second PDSCH, and the third PDSCH or a PDSCH based on a TTI length having a length of 1 ms in a TTI for transmitting a predetermined uplink control channel.

Additionally or alternatively, the PUCCH may be linked to a CCE (control channel element) index of a PDCCH (physical downlink control channel) that schedules a PDSCH based on a shorter TTI length among the first TTI length and the second TTI length or can be determined by the CCE index.

Additionally or alternatively, the PUCCH can be indicated by a PDCCH that schedules a PDSCH based on a shorter TTI length among the first TTI length and the second TTI length among a plurality of predetermined PUCCHs.

Additionally or alternatively, when the TTI for transmitting the uplink control channel for the first PDSCH is overlapped with the TTI for transmitting the uplink control channel for the second PDSCH, the uplink control information for the first PDSCH and the second PDSCH can be transmitted by one selected from the group consisting of a channel selection method, a new PUCCH format, and bundling.

Additionally or alternatively, when hopping of the PUCCH is not allowed within a TTI corresponding to the shorter TTI length, the method may further include receiving a configuration on whether or not a repetitive transmission of the PUCCH is allowed.

Additionally or alternatively, when the repetitive transmission of the PUCCH is allowed, the method may further include receiving configuration information including at least one selected from the group consisting of a TTI in which a repetition part of the PUCCH is transmitted, a TTI section during which the repetition part of the PUCCH is transmitted, an uplink resource in which the repetition part of the PUCCH is transmitted, and criteria for determining an uplink resource in which the repetition part of the PUCCH is transmitted.

To further achieve these and other advantages and in accordance with the purpose of the present invention, according to a different embodiment, a terminal configured to support multiple TTI (transmission time interval) lengths in a wireless communication system includes a transmitter and a receiver, and a processor that controls the transmitter and the receiver, the processor receives a first PDSCH (physical downlink shared channel) based on a first TTI length at first timing, receives a second PDSCH based on a second TTI length different from the first TTI length at second timing, when a TTI for transmitting an uplink control channel for the received first PDSCH is overlapped with a TTI for transmitting an uplink control channel for the second PDSCH, transmits uplink control information for the first PDSCH and the second PDSCH on a PUCCH (physical uplink control channel) having a shorter TTI length among the first TTI length and the second TTI length.

Additionally or alternatively, the PUCCH may be transmitted in a shorter TTI among TTIs for transmitting an uplink control channel for the first PDSCH or the second PDSCH.

Additionally or alternatively, the PUCCH can be transmitted in a TTI for transmitting a predetermined uplink control channel.

Additionally or alternatively, when a TTI for transmitting an uplink control channel for a third PDSCH is overlapped with the TTI for transmitting the uplink control channel for the first PDSCH and the second PDSCH, the processor may transmit an uplink control channel for a PDSCH based on a longest TTI among the first PDSCH, the second PDSCH, and the third PDSCH or a PDSCH according to a TTI length having a length of 1 ms in a TTI for transmitting a predetermined uplink control channel.

Additionally or alternatively, the PUCCH may be linked to a CCE (control channel element) index of a PDCCH (physical downlink control channel) that schedules a PDSCH based on a shorter TTI length among the first TTI length and the second TTI length or can be determined by the CCE index.

Additionally or alternatively, the PUCCH may be indicated by a PDCCH that schedules a PDSCH based on a shorter TTI length among the first TTI length and the second TTI length among a plurality of predetermined PUCCHs.

Additionally or alternatively, when the TTI for transmitting the uplink control channel for the first PDSCH is overlapped with the TTI for transmitting the uplink control channel for the second PDSCH, the uplink control information for the first PDSCH and the second PDSCH may be transmitted by one selected from the group consisting of a channel selection method, a new PUCCH format, and bundling.

Additionally or alternatively, when hopping of the PUCCH is not allowed within a length of the shorter TTI, the processor may receive a configuration on whether or not a repetitive transmission of the PUCCH is allowed.

Additionally or alternatively, when the repetitive transmission of the PUCCH is allowed, the processor may receive configuration information including at least one selected from the group consisting of a TTI at which a repetition part of the PUCCH is transmitted, a TTI section during which the repetition part of the PUCCH is transmitted, an uplink resource in which the repetition part of the PUCCH is transmitted, and criteria for determining an uplink resource in which the repetition part of the PUCCH is transmitted.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently transmit and receive an uplink control channel in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
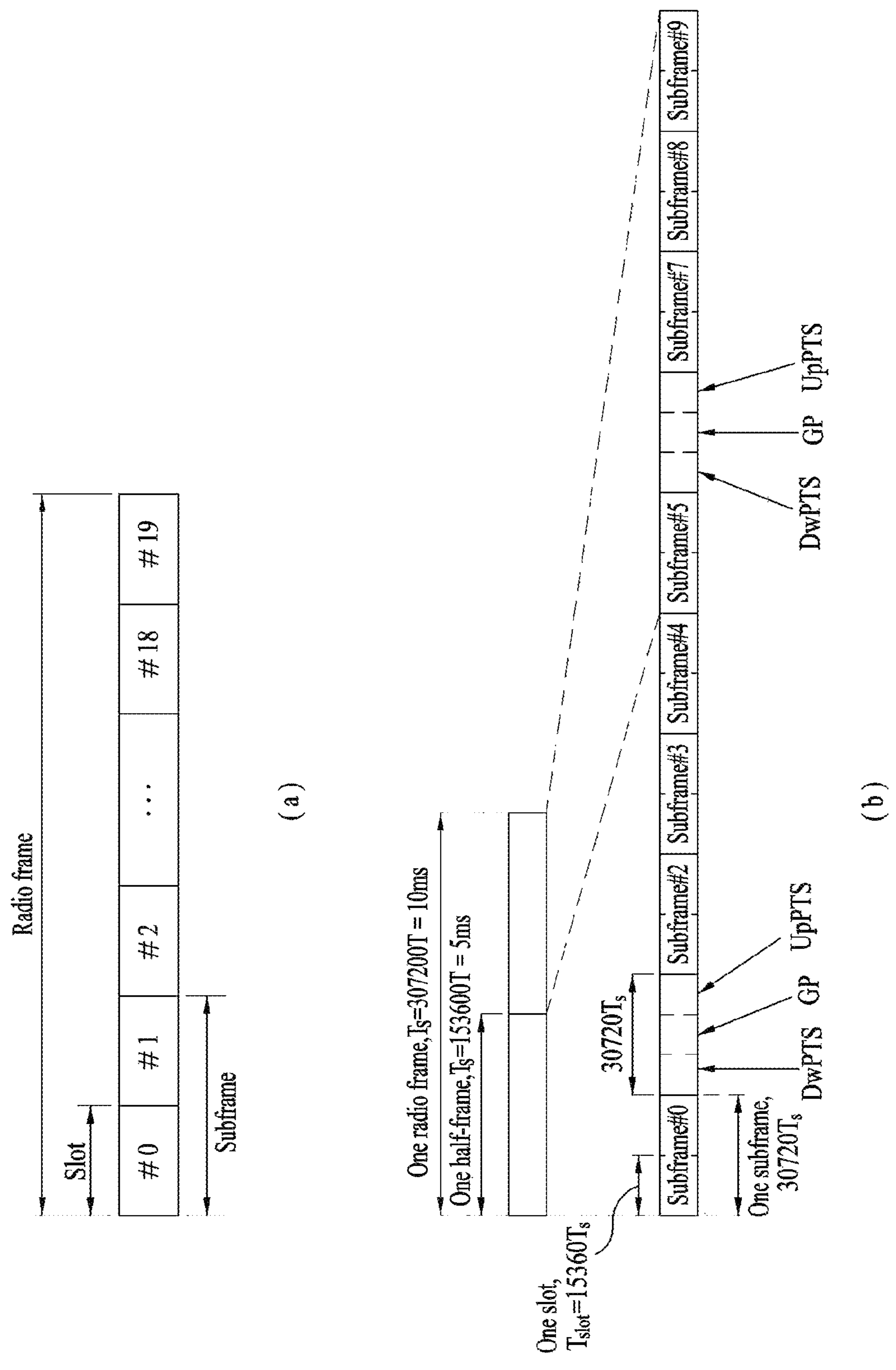
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(*a*) illustrates a frame structure for frequency division duplex (FDD) used in 3GPP LTE/LTE-A and FIG. 1(*b*) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
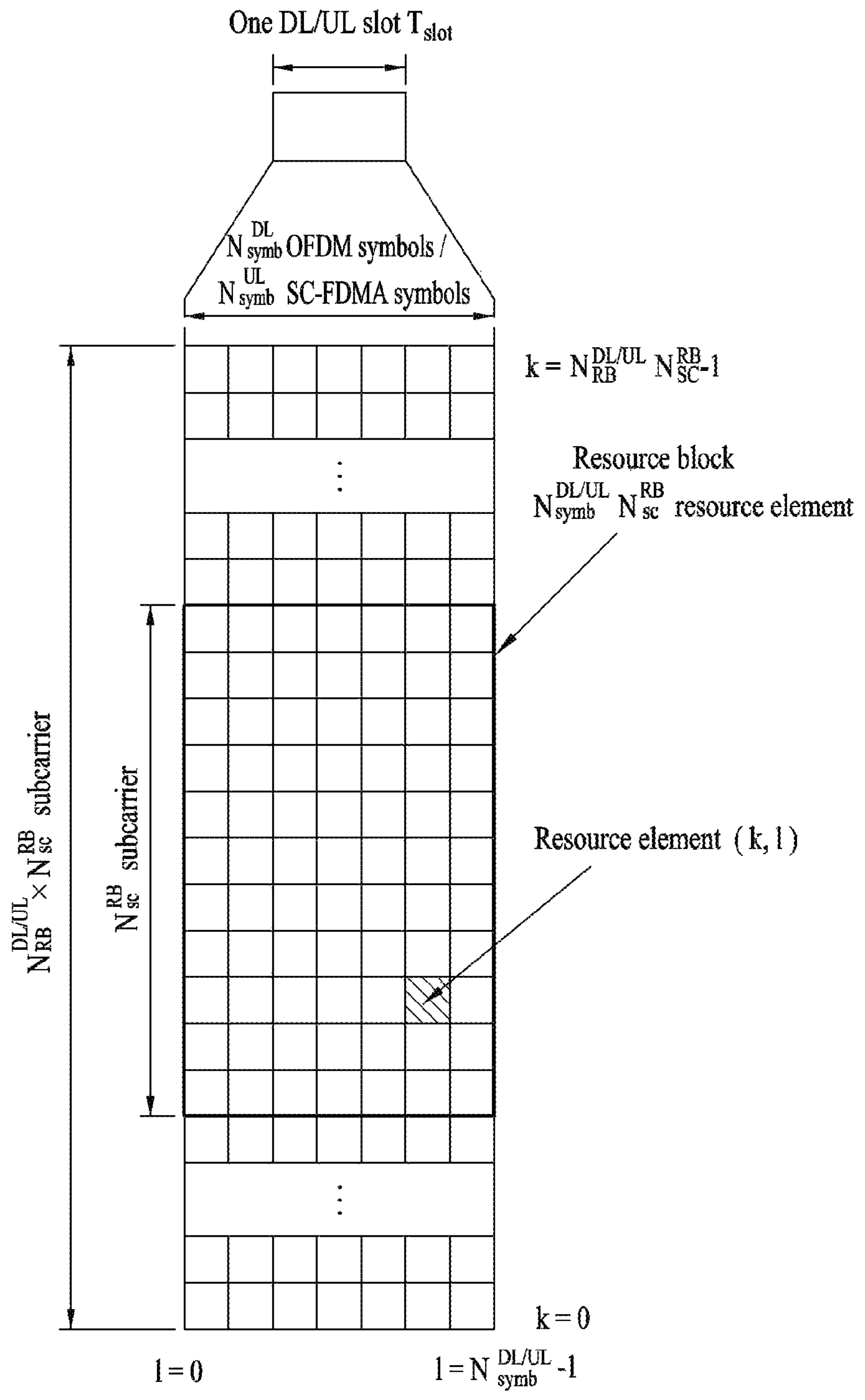
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ symb OFDM symbols. Here, RB $N_{RB}^{DL}$ denotes the number of RBs in a downlink slot and $N_{RB}^{UL}$ RB denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of symb $N_{RB}^{DL/UL}*N_{sc}^{RB}$ REs. Each RE in a resource grid can be uniquely defined by an index pair (k, 1) in a slot. Here, k is an index in the range of 0 to $N_{symb}^{DL/UL}*N_{sc}^{RB}-1$ in the frequency domain and 1 is an index in the range of 0 to symb $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
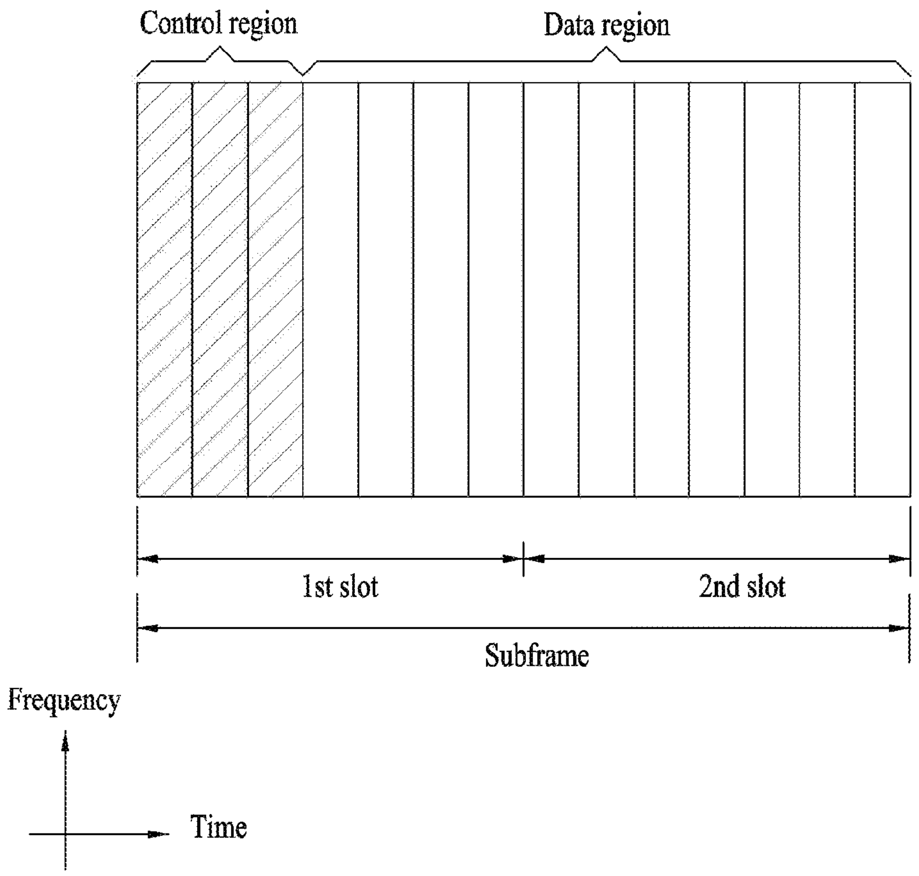
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | |
|---|---|---|---|
| Type | Aggregation Level L | Size [in CCEs] | Number of PDCCH candidates M(L) |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of “A” and information about data transmitted using a radio resource (e.g., frequency position) of “B” and transmission format information (e.g., transport block size, modulation scheme, coding information, etc.) of “C” is transmitted through a specific DL subframe, the UE monitors PDCCHs using RNTI information and a UE having the RNTI of “A” detects a PDCCH and receives a PDSCH indicated by “B” and “C” using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
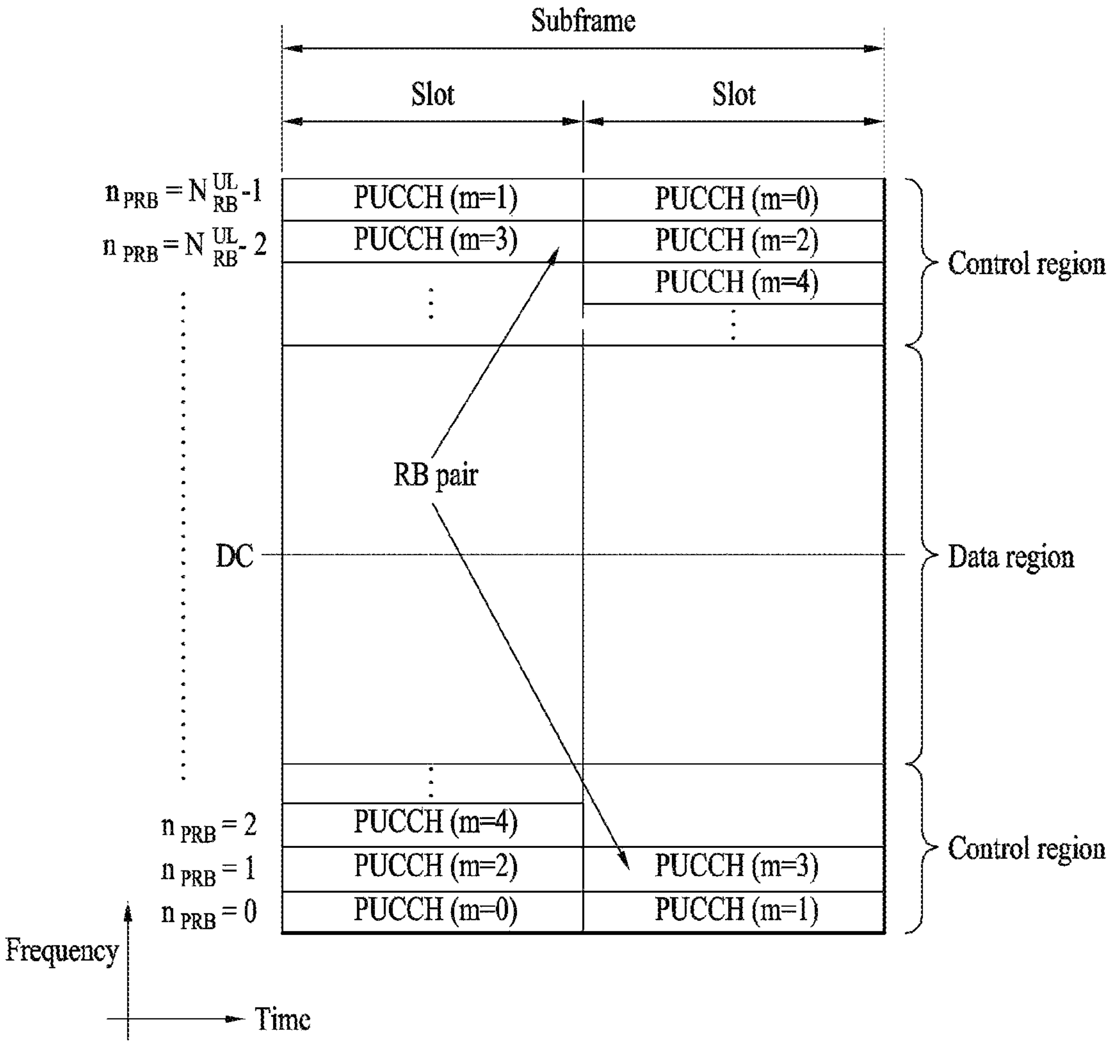
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4bit) 2nd wideband CQI(4bit) if RI > 1 N*Subband PMI(4bit) (N is the total # of subbands) (if 8Tx Ant, N*subband W2 + wideband W1) |

TABLE 6-continued

| | PMI Feedback Type<br>No PMI | <br>Single PMI | <br>Multiple PMIs |
|---|---|---|---|
| UE selected (Subband CQI) | Mode 2-0<br>RI (only for Open-loop SM)<br>1st wideband CQI(4bit) + Best-M CQI(2bit)<br>(Best-M CQI: An average CQI for M SBs selected from among N SBs)<br>Best-M index (L bit) | | Mode 2-2<br>RI<br>1st wideband CQI(4bit) + Best-M CQI(2bit)<br>2nd wideband CQI(4bit) + Best-M CQI(2bit) if RI > 1<br>Best-M index (L bit)<br>Wideband PMI(4bit) + Best-M PMI(4bit)<br>(if 8Tx Ant, wideband W2 + Best-M W2 + wideband W1) |
| Higher Layer-configured (Subband CQI) | Mode 3-0<br>RI (only for Open-loop SM)<br>1st wideband CQI(4bit) + N*subbandCQI(2bit) | Mode 3-1<br>RI<br>1st wideband CQI(4bit) + N*subbandCQI(2bit)<br>2nd wideband CQI(4bit) + N*subbandCQI(2bit) if RI > 1<br>Wideband PMI(4bit)<br>(if 8Tx Ant, wideband W2 + wideband W1) | Mode 3-2<br>RI<br>1st wideband CQI(4bit) + N*subbandCQI(2bit)<br>2nd wideband CQI(4bit) + N*subbandCQI(2bit) if RI > 1<br>N*Subband PMI(4bit)<br>(N is the total # of subbands)<br>(if 8Tx Ant, N*subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
|---|---|
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
|---|---|
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

The present invention relates to a method of providing a plurality of different services in a system by applying a different service parameter according to a service or a UE to satisfy a requirement of each of a plurality of the services. In particular, the present invention relates to a method of reducing latency as much as possible by transmitting data as soon as possible during a short time period using a short TTI (transmission time interval) for a service/UE sensitive to latency and transmitting a response within short time in response to the data. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI. The present invention proposes a method of transmitting control information and a data signal for enabling the abovementioned operation and a multiplexing method.

For clarity, 1 ms currently used in LTE/LTE-A system is assumed as a basic TTI. A basic system is also based on LTE/LTE-A system. When a different service/UE is provided in a base station of LTE/LTE-A system based on a TTI of 1 ms (i.e., a subframe length), a method of transmitting a data/control channel having a TTI unit shorter than 1 ms is proposed for a service/UE sensitive to latency. In the following, a TTI of 1 ms is referred to as a normal TTI, a TTI of a unit smaller than 1 ms (e.g., 0.5 ms) is referred to as a short TTI, and a TTI of a unit longer than 1 ms (e.g., 2 ms) is referred to as a long TTI.

Figure 5:
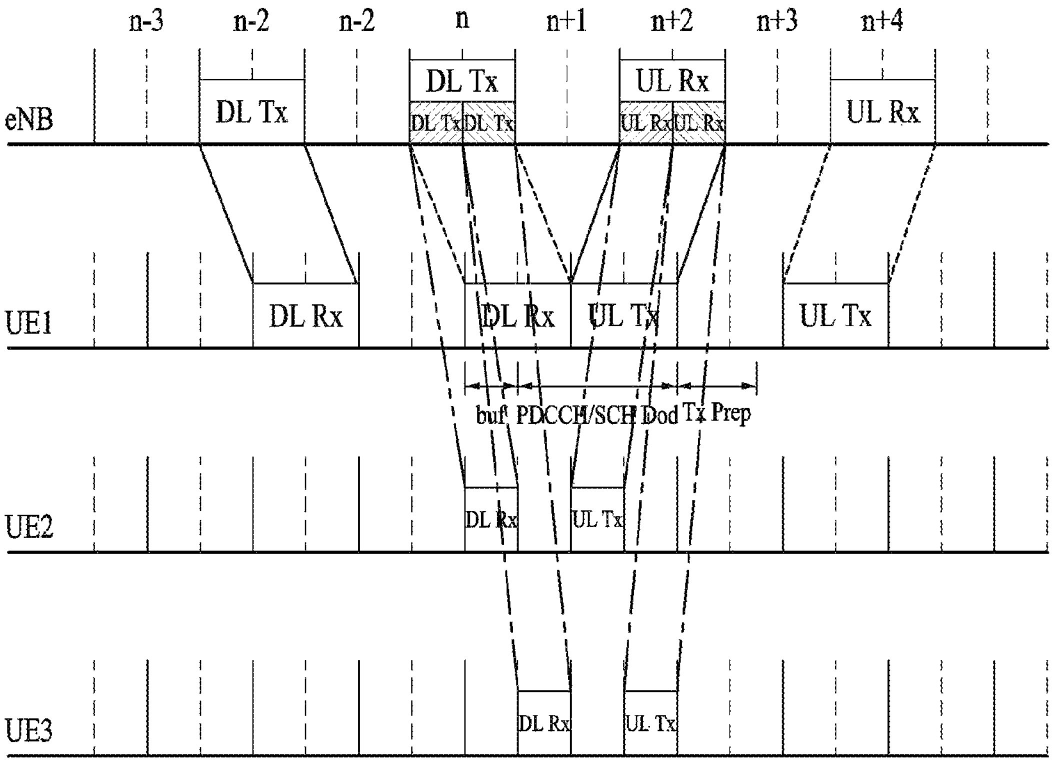
FIG. 5 is a diagram illustrating DL reception timing and UL transmission timing of UEs operating with a different TTI (transmission time interval)

First of all, a method of supporting a short TTI of a unit shorter than 1 ms in a system basically using a normal TTI of 1 ms unit used in legacy LTE/LTE-A system is described. First of all, downlink (DL) is explained. Multiplexing between channels having a different TTI size in an eNB and an example of uplink (UL) transmission for the multiplexing are shown in FIG. 5. As a TTI is getting shorter, time taken for a UE to buffer and decode a control channel and a data channel is getting shorter. Time taken for performing UL transmission in response to the control channel and the data channel is getting shorter. As shown in the example of FIG. 5, in case of transmission of 1 ms TTI, when a DL channel is transmitted in a specific $n^{th}$ subframe, an eNB can receive a response in an $(n+4)^{th}$ subframe in response to the DL channel. In case of transmission of 0.5 TTI, when a DL channel is transmitted in a specific $n^{th}$ subframe, an eNB can receive a response in an $(n+2)^{th}$ subframe in response to the DL channel. In particular, in order to support TTIs of a different length, it is necessary to support backward compatibility to prevent an impact on a UE operating in a legacy system only for DL and UL multiplexing of channels having a different TTI.

When DL/UL channels having a different length of TTI are multiplexed, it is necessary to define a method for a UE, which has received the channels, to read a control channel and transmit/receive a data channel A UE supporting a normal TTI only, a UE supporting a normal TTI and a short TTI, and a UE supporting a normal TTI, a short TTI, and a long TTI may coexist in a system. In this case, when a UE supports a short TTI and a normal TTI, it means that the UE is able to receive and demodulate both a channel transmitted with a short TTI ("short TTI channel") and a channel transmitted with a normal TTI ("normal TTI channel") and is able to generate and transmit the short TTI channel and the normal TTI channel in UL.

In a legacy LTE/LTE-A system, one subframe, i.e., a TTI, has a length of 1 ms and one subframe includes two slots. One slot corresponds to 0.5 ms. In case of a normal CP, one slot includes 7 OFDM symbols. A PDCCH (physical downlink control channel) is positioned at a forepart of a subframe and is transmitted over the whole band. A PDSCH (physical downlink shared channel) is transmitted after the PDCCH. PDSCHs of UEs are multiplexed on a frequency axis after a PDCCH section. In order for a UE to receive PDSCH of the UE, the UE should know a position to which the PDSCH is transmitted. Information on the position, MCS information, RS information, antenna information, information on a transmission scheme, information on a transmission mode (TM), and the like can be obtained via the PDCCH. For clarity, PDCCH having a short TTI and PDSCH having a short TTI are referred to as sPDCCH and sPDSCH, respectively. If a UE receives the sPDSCH, the UE transmits HARQ-ACK via a PUCCH (physical uplink control channel) in response to the sPDSCH. In this case, a PUCCH having a short TTI is referred to as sPUCCH.

Handling of ACK/NACK (A/N) Overlap Between Different TTIs

Figure 6:
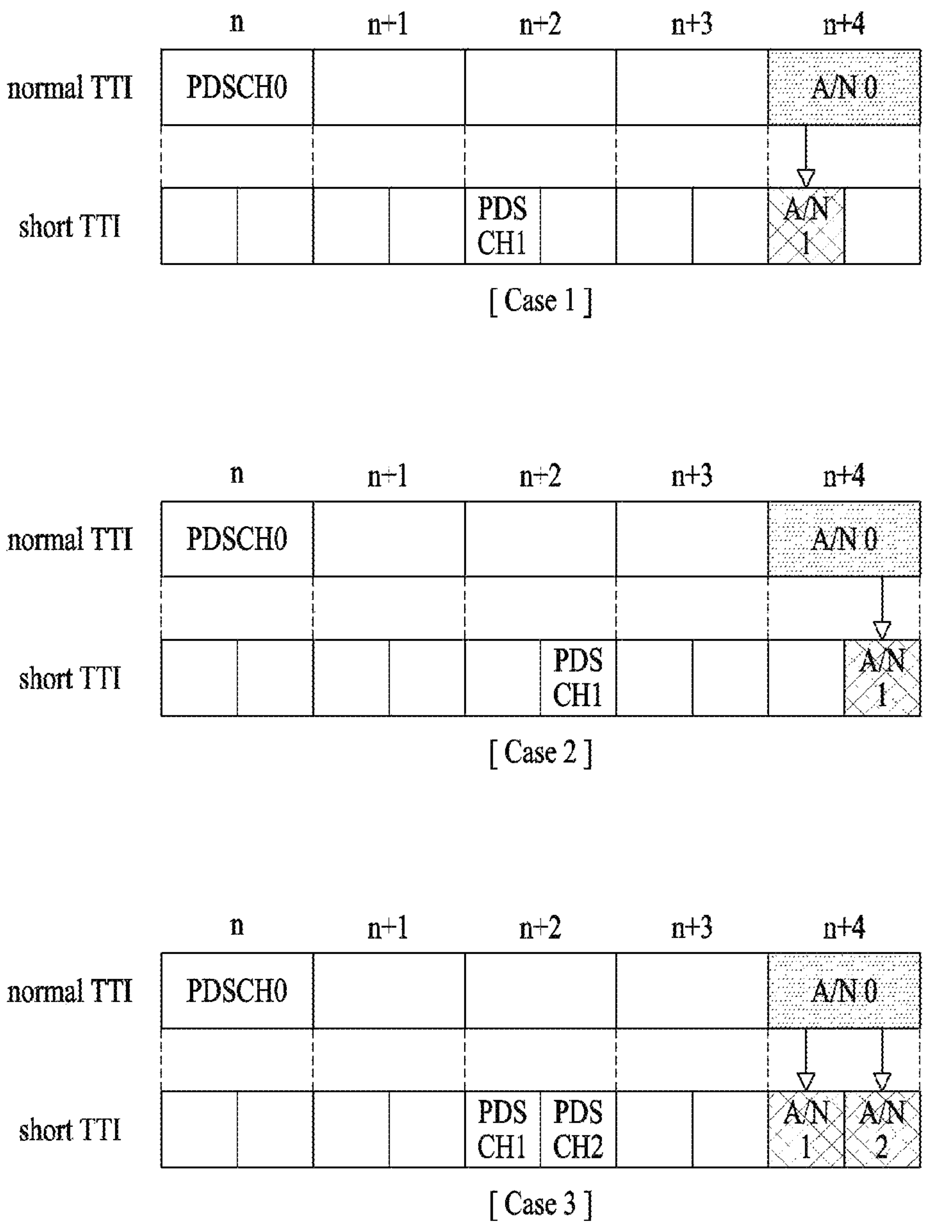
FIG. 6 is a diagram illustrating an example of processing a case that transmission timing of HARQ ACK/NACK feedback of a different TTI (transmission time interval) is overlapped according to one embodiment of the present invention.

It may consider a case that DL channels having a different length of TTI are multiplexed and a UE, which has received the DL channels, transmits HARQ-ACK feedback in response to the DL channels. Specifically, it may consider a case that transmission timing of HARQ-ACK feedback for a PDSCH having a short TTI is overlapped with transmission timing of HARQ-ACK feedback for a PDSCH having a normal TTI. FIG. 6 illustrates an example for the case. When a DL channel is transmitted in a specific $n^{th}$ subframe, in case of a normal TTI, an eNB can receive a response in an $(n+4)^{th}$ subframe in response to the DL channel On the contrary, when a DL channel is transmitted in a specific $n^{th}$ subframe, in case of a short TTI (e.g., 0.5 ms), an eNB can receive a response in an $(n+2)^{th}$ subframe in response to the DL channel. A case that A/Ns having a different TTI are overlapped corresponds to an example for case that a short TTI is the half of a normal/legacy TTI. Yet, the case can also be applied to a short TTI having a different size.

Referring to [case 1] of FIG. 6, transmission timing of HARQ-ACK feedback for a PDSCH having a normal TTI is overlapped with transmission timing of HARQ-ACK feedback for a PDSCH having a short TTI scheduled in a first slot. Referring to [case 2] of FIG. 6, transmission timing of HARQ-ACK feedback for a PDSCH having a normal TTI is overlapped with transmission timing of HARQ-ACK feedback for a PDSCH having a short TTI scheduled in a second slot. Referring to [case 3] of FIG. 6, transmission timing of HARQ-ACK feedback for a PDSCH having a normal TTI is overlapped with transmission timing of HARQ-ACK feedbacks for two PDSCHs having a short TTI scheduled in a second slot. In particular, if transmission timings of HARQ-ACK feedbacks, which are transmitted in response to DL channels of a different length of TTI, are overlapped, it is necessary for a UE to have a method for efficiently transmitting the HARQ-ACK feedback. In general, when a short TTI corresponds to 1/n of a normal/legacy TTI, the method can be applied to cases that HARQ-ACK feedback for a PDSCH transmitted with one or a plurality of short TTIs among the n number of short TTIs is overlapped with HARQ-ACK feedback transmitted with a normal TTI (or, a long TTI).

According to one embodiment of the present invention, if transmission timings of a plurality of HARQ-ACK feedbacks having a different TTI are overlapped, a UE can transmit A/N information via sPUCCH having a short TTI. In the following, a method of transmitting sPUCCH configured by a plurality of HARQ-ACK feedbacks is explained.

(1) Regarding Transmission Timing

A. If transmission timings for a plurality of HARQ-ACK feedbacks having a different TTI are overlapped, a plurality of the HARQ-ACK feedbacks are transmitted at HARQ-ACK feedback transmission timing having a shortest TTI carried on sPUCCH together. For example, referring to the case 1, short TTI A/N information and normal TTI ACK/NACK information are transmitted together via sPUCCH in a first slot of SF # n+4. Referring to the case 2, short TTI A/N information and normal TTI A/N information are transmitted together via sPUCCH in a second slot of SF # n+4. Referring to the case 3, short TTI A/N 1 information and normal TTI A/N information are transmitted together via sPUCCH in a first slot of SF # n+4 and short TTI A/N 2 information and normal TTI A/N information are transmitted together via sPUCCH in a second slot of SF # n+4. In case of the case 3, since the normal TTI A/N information is transmitted together with the short TTI A/N information 1 and the short TTI A/N information 2 (i.e., repetition), it may be able to increase reliability.

B. If transmission timings for a plurality of HARQ-ACK feedbacks having a different TTI are overlapped, a plurality of the HARQ-ACK feedbacks can be transmitted in a manner of being carried on PUCCH/sPUCCH of HARQ-ACK feedback transmission timing having a predefined (or, signaled) TTI.

C. Similar to the case 3, if transmission timings for HARQ-ACK feedbacks having a plurality of short TTIs are overlapped during a time period corresponding to a normal TTI, it may be able to define a rule that normal TTI A/N information is to be transmitted on sPUCCH of predefined/promised timing (or, timing designated via signaling).

(2) Regarding Transmission Resource

A. It may be able to define a rule that a transmission resource of sPUCCH including short TTI A/N information and normal (or long) TTI A/N information is to be linked with a CCE index of a DL grant control channel (i.e., PDCCH or EPDCCH) that schedules a corresponding short TTI A/N target PDSCH. Or, it may indicate that a short TTI A/N resource is used. Or, it may use a normal (or long) TTI A/N resource. In particular, when A/N resources for a DL channel transmission of a length of two or more TTIs are overlapped and are not overlapped, it may indicate that resource selection for at least one TTI is used.

B. It may be able to define a rule that (a plurality of) resources for sPUCCH are defined/configured in advance via a higher layer signal and one of the resources is to be indicated via a specific field (e.g., a TPC (transmission power control)/ARI (ack/nack resource indicator) field) included in a DL grant control channel (i.e., PDCCH or EPDCCH) scheduling a short TTI A/N target PDSCH to indicate a resource in which the sPUCCH is transmitted. A method of designating a transmission resource can be applied only when a collision occurs between A/N resources. Or, the method can also be applied even when there is no collision. In particular, in order to solve a collision issue, it may be able to introduce an indicator to dynamically change an A/N resource.

C. If transmission timings of a plurality of HARQ-ACK feedbacks having a different TTI are overlapped, an eNB can determine a transmission method from among a channel selection method and a PUCCH format 3 (or a new PUCCH format) in advance. Or, if TTIs are overlapped, it may unconditionally apply bundling. The bundling can be applied according to a codeword (same codeword of two TTIs). Or, if one or more codewords exist according to a TTI, it may apply the bundling between the codewords according to a TTI. In case of the former method, when A/N for each TTI is 1 bit and there is a single codeword, A/N of 1 bit is generated. On the contrary, in case of the latter method, since A/N bit of 1 bit is generated according to a TTI, at least two bits are always required. More generally, if A/N bit according to a TTI is equal to or greater than 1 bit (e.g., A/N transmitted over a plurality of subframes of TDD), A/N is processed according to a TTI and the A/N can be transmitted using a PUCCH format 3 or a channel selection method.

D. If DL channels of a different TTI rotate without MIMO transmission, each of short TTI A/N information and normal (or long) TTI A/N information is regarded as a single codeword and A/N transmission for two TTIs can be performed. A part corresponding to a normal (or long) TTI can be handled as a first codeword and a part corresponding to a short TTI can be handled as a second codeword, and vice versa. In this case, if one or more codewords are transmitted within a single TTI, it may assume that bundling is preferentially performed between the codewords.

According to a different embodiment of the present invention, if transmission timings of a plurality of HARQ-ACK feedbacks having a different TTI are overlapped, a UE can transmit corresponding A/N information via a legacy PUCCH having a normal TTI. In the following, a method of transmitting sPUCCH configured by a plurality of HARQ-ACK feedbacks is explained in detail. Although options described in the following are explained with an example of a PUCCH format 3, by which the present invention may be non-limited. It is apparent that it is able to apply the options to a different UL control channel as well.

Figure 7:
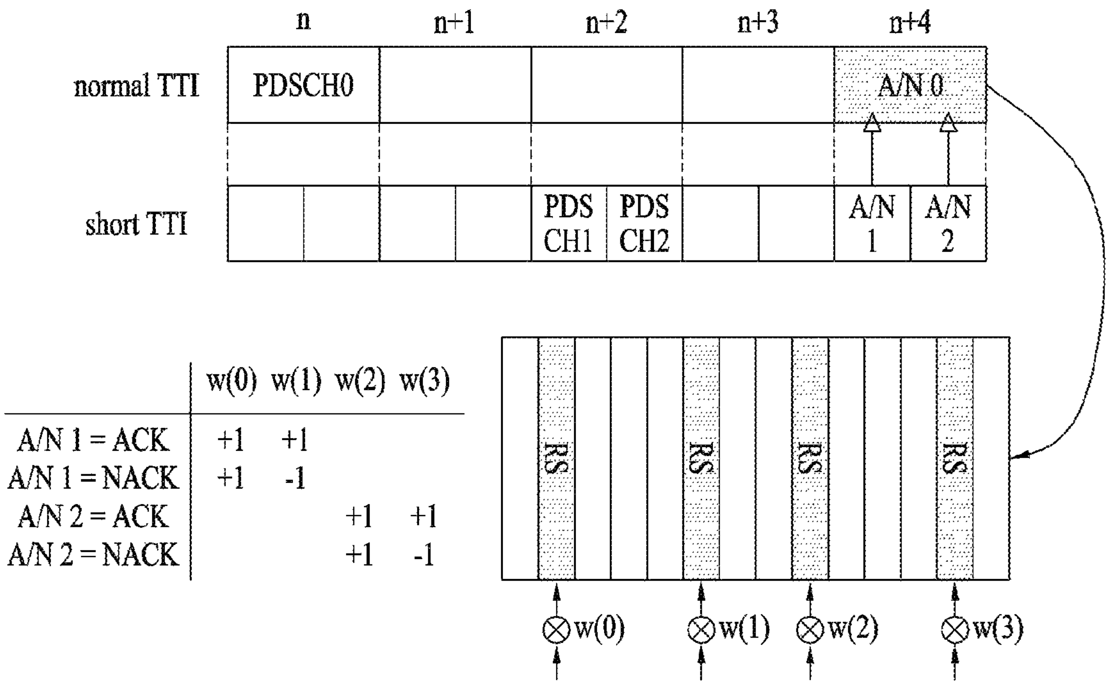
FIG. 7 is a diagram illustrating an example of processing a case that transmission timing of HARQ ACK/NACK feedback of a different TTI (transmission time interval) is overlapped according to one embodiment of the present invention.

(1) Option 1: If transmission timings of a plurality of HARQ-ACK feedbacks having a different TTI are overlapped, a UE can transmit corresponding A/N information using a PUCCH format 3 having a normal TTI. In this case, a payload of the PUCCH format 3 configures normal TTI A/N information only and it may be able to represent as short TTI A/N information applies an OCC (orthogonal cover code) (e.g., +1, +1 or +1, −1) between DMRSs in each slot constructing the PUCCH format 3. FIG. 7 illustrates a detail example of the option 1.

Figure 8:
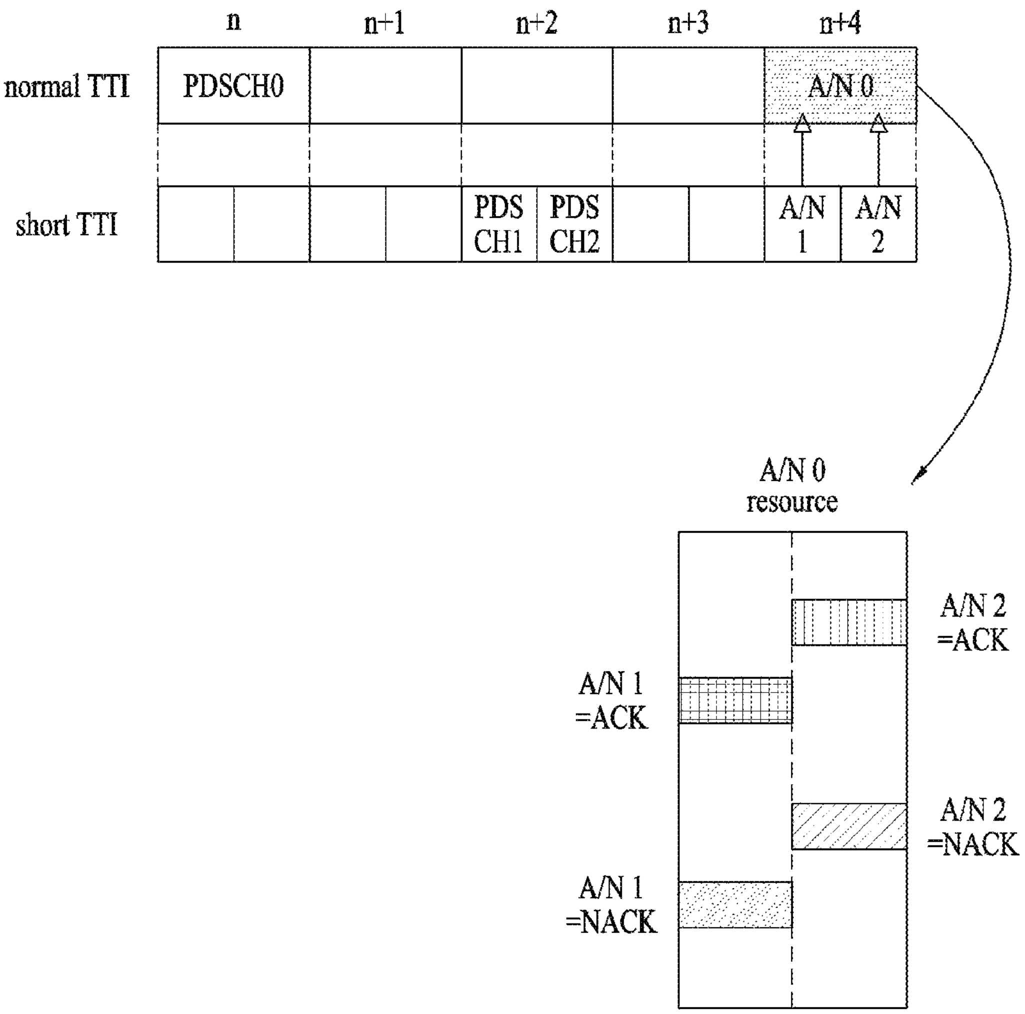
FIG. 8 is a diagram illustrating an example of processing a case that transmission timing of HARQ ACK/NACK feedback of a different TTI (transmission time interval) is overlapped according to one embodiment of the present invention.

(2) Option 2: If transmission timings of a plurality of HARQ-ACK feedbacks having a different TTI are overlapped, a UE can transmit corresponding A/N information using a PUCCH format 3 having a normal TTI. In this case, a payload of the PUCCH format 3 configures long TTI A/N information only and short TTI A/N information can be represented by a channel selection method. FIG. 8 illustrates a detail example of the option 2.

According to a further different embodiment of the present invention, if transmission timings of a plurality of HARQ-ACK feedbacks having a different TTI are overlapped, it may be able to define/promise a channel to be used in advance among sPUCCH having a short TTI and a legacy PUCCH having a normal TTI. Or, it may be able to define a rule that an eNB configures a channel to be used among sPUCCH having a short TTI and a legacy PUCCH having a normal TTI via higher layer signaling or physical layer signaling.

Or, it may be able to determine a channel to be used among sPUCCH having a short TTI and a legacy PUCCH having a normal TTI according to a total payload size of UCI (uplink control information) or a coding rate of the UCI without any separate configuration.

According to a further different embodiment of the present invention, A/N transmissions as many as a specific number can be dropped only when transmission timings of a plurality of HARQ-ACK feedbacks having a different TTI are overlapped. A/N transmission to be dropped can be configured by a network. A higher priority can be provided to a retransmission. Or, the determination may vary depending on power of a UE. For example, if power for transmitting a single TTI already arrives at PCmax, c, since it is unable to increase power for increasing A/N bit, the remaining A/N can be dropped or unconditional bundling can be performed.

According to a further different embodiment of the present invention, if transmission timings of a plurality of HARQ-ACK feedbacks having a different TTI are overlapped, a UE can perform transmission by differently applying an aggregation/bundling method of A/N according to UL transmit power.

In case of transmitting A/N by aggregating/bundling the A/N via the aforementioned scheme, A/N can be dropped or bundled in a single TTI only when power according to newly transmitted A/N is higher than PCmax, c, or power is restricted due to carrier aggregation (CA) or the like. In particular, if transmit power is sufficient enough, A/N of many bits is transmitted via a PUCCH format 3 or a channel selection method. If there is a restriction on transmit power, a plurality of A/N can be bundled or one of a plurality of A/N can be dropped. In general, if a configuration of A/N bit is changed, it is necessary to reconfigure dynamically allocated power as well in consideration of a TPC loop operating in accordance with a short/normal TTI. In particular, it indicates that an actual transmit power configuration is configured according to a short TTI, a normal TTI, or the number of transmitted A/N bits.

According to a further different embodiment of the present invention, if transmission timings of a plurality of HARQ-ACK feedbacks having a different TTI are overlapped, a UE regards normal TTI A/N and short TTI A/N as A/N information of a Pcell and A/N information of a Scell, respectively. Or, the UE regards short TTI A/N and normal TTI A/N as A/N information of a Pcell and A/N information of a Scell, respectively. Then, the UE can transmit A/N information by mapping the information according to a legacy channel selection method.

For example, it may assume that A/N timing of a short TTI corresponds to Pcell timing. And, it may assume that A/N timing of a normal TTI or a different TTI corresponds to Scell timing. In order to transmit the A/N, a UE may assume that Pcell and Scell are aggregated each other. On the contrary, it may assume that A/N timing of a normal TTI or a different TTI corresponds to Pcell timing. In case of the former case, it may assume that A/N is transmitted according to the timing of the short TTI. In case of the latter case, it may assume the A/N is transmitted according to the timing of the normal TTI. In case of using the latter case, a plurality of A/N of a short TTI can be overlapped with PUCCH transmission timing of a normal TTI. In this case, it may be able to perform aggregation or bundling. In this case, it may follow a resource selection method and a PUCCH format in carrier aggregation (CA).

Handling of A/N and CQI Overlap Between Different TTIs

According to a further different embodiment of the present invention, if transmission timing of HARQ-ACK feedback having a different TTI is overlapped with transmission timing of CQI feedback, it is necessary to efficiently utilize a resource. If transmission timing of HARQ-ACK feedback having a different TTI is overlapped with transmission timing of CQI feedback, it may consider multiplexing methods described in the following.

(1) Option 1: If transmission timing of HARQ-ACK feedback having a short TTI is overlapped with transmission timing of CQI having a normal TTI, a UE transmits corresponding information by multiplexing the information via a legacy PUCCH having a normal TTI. In this case, a payload of a PUCCH format 2/2a/2b/3 (or, a newly defined PUCCH format) is configured by CQI feedback information only and short TTI A/N information can be represented by applying an OCC between DMRSs. Or, the short TTI A/N information can be represented by a channel selection method.

(2) Option 2: If transmission timing of HARQ-ACK feedback having a normal TTI is overlapped with transmission timing of CQI having a short TTI, a UE transmits corresponding information by multiplexing the information via sPUCCH having a short TTI. In this case, a payload of the sPUCCH is configured by CQI feedback information only and normal TTI A/N information can be represented by applying an OCC between DMRSs. Or, the normal TTI A/N information can be represented by a channel selection method.

Resource Allocation of sPUCCH

According to LTE standard, a legacy PUCCH has considered slot hopping to obtain a frequency diversity gain. Yet, if a length of a short TTI is configured by 0.5 ms or time shorter than 0.5 ms, it may be difficult to consider the legacy slot hopping within the TTI in designing sPUCCH. Meanwhile, if the legacy PUCCH is mapped to a resource of a PRB index 0 in a first slot, the legacy PUCCH is automatically mapped to a resource of a PRB index ($N_{RB}^{UL-1}$) in a second slot. However, if the hopping (i.e., PUCCH hopping within TTI) is introduced to a short TTI, it may wrongly set a limit on the legacy PUCCH. Hence, it is preferable that a sPUCCH resource does not perform hopping within a TTI. For example, if sPUCCH having a short TTI is mapped to a resource of a PRB index 0 of a first slot, it may be able to make the legacy PUCCH not to be mapped to a resource of a PRB index ($N_{RB}^{UL-1}$) of a second slot.

In particular, if a resource of sPUCCH has a short TTI, the resource can be mapped to a specific PRB index during a time period of a predetermined length (i.e., a time period corresponding to the predetermined number of TTIs). And/or, the resource can be mapped to a different specific PRB index during the remaining time. In particular, it may be able to expect an effect that the resource of the sPUCCH is mapped to the same resource to which slot hopping of a normal TTI is applied. Specifically, if a length of a short TTI is configured by 0.5 ms, it may be able to define a rule that sPUCCH is mapped to a different physical resource in every TTI (i.e., 0.5 ms).

In particular, in case of a short TTI, a resource index, which is mapped according to a TTI index, corresponds to a virtual index rather than a physical index. A function for mapping a virtual index to a physical index can be defined according to each TTI. By doing so, it may be able to make a legacy PUCCH resource or a PUCCH resource of a long TTI to be multiplexed with a PUCCH resource of a short TTI.

As a different example, if a length of a short TTI is configured by 1 SC-FDMA symbol, it may be able to define a rule that sPUCCH is mapped to the same physical resource during 7 TTIs and is mapped to a different physical resource during next 7 TTIs. The rule can be applied to a predetermined (or, signaled) specific PUCCH format only.

In particular, if sPUCCH hopping within a TTI is not supported, it may cause a problem of decreasing coverage of a control channel. In order to solve the problem, a UE can repetitively transmit a specific sPUCCH during the (predetermined or signaled) specific number of TTIs. A method of repetitively transmitting sPUCCH is described in the following in detail.

(1) It may be able to define a rule that an eNB allows a UE to repeat sPUCCH via higher layer (or, physical layer) signaling. When sPUCCH repetition is allowed, the eNB can configure the number of TTIs at which a repetition part of the sPUCCH is transmitted, the number of TTIs during which the repetition part of the sPUCCH is transmitted, detail information on a resource in which the repetition part of the sPUCCH is to be transmitted, information on whether to follow legacy resource mapping, information on whether or not the repetition part of the sPUCCH is transmitted in a separate resource, and the like via higher layer signaling or physical layer signaling.

(2) In order to make a UE transmit a repetition part of sPUCCH at a specific TTI, it may be able to define a rule that transmission of the repetition part is allowed only when there is no sPUCCH to be newly transmitted at the TTI.

(3) If transmission timing of a repetition part of sPUCCH is overlapped with transmission timing of a new sPUCCH, it may be able to define a rule that the repetition part of the sPUCCH and the new sPUCCH are transmitted on a single sPUCCH by bundling the repetition part of the sPUCCH with the new sPUCCH. In this case, the sPUCCH can be transmitted by a predetermined resource or a resource indicated by higher layer/physical layer signaling among (predetermined/signaled separate) resources in which the new sPUCCH or the repetition part is to be transmitted.

Figure 9:
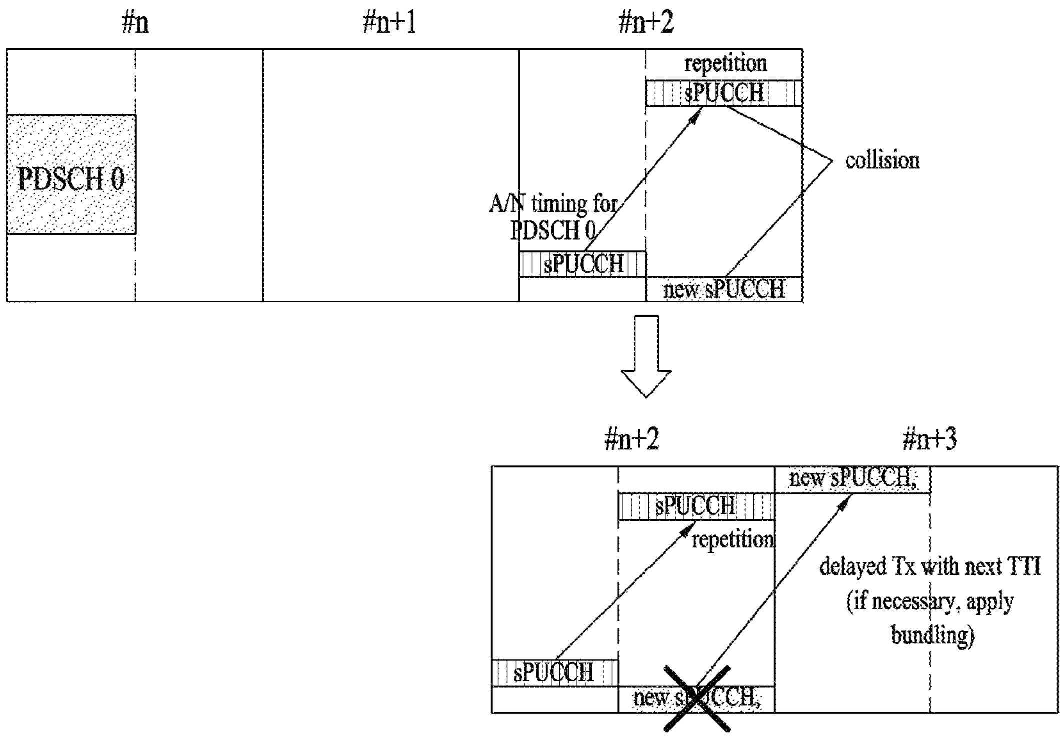
FIG. 9 is a diagram illustrating an example of processing a case that transmission of a repeated part of HARQ ACK/NACK feedback is collided with a different HARQ ACK/NACK feedback according to one embodiment of the present invention.

(4) If transmission timing of a repetition part of sPUCCH is overlapped with transmission timing of a new sPUCCH, it may be able to define a rule that the new sPUCCH is to be transmitted at a next TTI. If transmission timing of the new sPUCCH, which is delayed as much as 1 TTI, is overlapped with transmission timing of a different sPUCCH, it may be able to define a rule that the new sPUCCH and the different sPUCCH are to be transmitted on a single sPUCCH by bundling the new sPUCCH with the different sPUCCH. In this case, the sPUCCH can be transmitted by a predetermined resource or a resource indicated by higher layer/physical layer signaling among (predetermined/signaled separate) resources in which the delayed new sPUCCH or the different sPUCCH is to be transmitted. FIG. 9 illustrates a specific example for the abovementioned rule.

Figure 10:
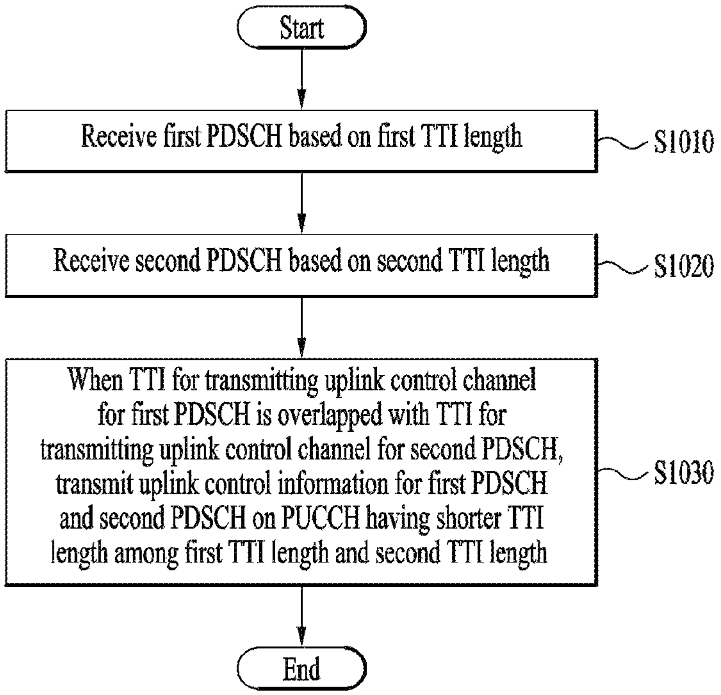
FIG. 10 is a flowchart for an operation according to one embodiment of the present invention.

FIG. 10 is a flowchart for an operation according to one embodiment of the present invention.

FIG. 10 illustrates a method of transmitting an uplink control channel for a UE configured to support multiple TTI (transmission time interval) lengths in a wireless communication system. The method is performed by the UE.

The UE may receive a first PDSCH (physical downlink shared channel) based on a first TTI length from an eNB at first timing [S1010]. The UE may receive a second PDSCH based on a second TTI length different from the first TTI length from the eNB at second timing [S1020].

When a TTI for transmitting an uplink control channel for the first PDSCH is overlapped with a TTI for transmitting an uplink control channel for the second PDSCH, the UE may transmit uplink control information for the first PDSCH and the second PDSCH to the eNB on a PUCCH (physical uplink control channel) having a shorter TTI length among the first TTI length and the second TTI length [S1030].

In this case, the PUCCH may be transmitted in a shorter TTI among the TTI for transmitting the uplink control channel for the first PDSCH and the TTI for transmitting the uplink control channel for the second PDSCH. Or, the PUCCH may n be transmitted in a TTI for transmitting a predetermined uplink control channel.

When a TTI for transmitting an uplink control channel for a third PDSCH is overlapped with the TTI for transmitting the uplink control channel for the first and the second PDSCH, the UE may transmit an uplink control channel for a PDSCH based on a longest TTI among the first PDSCH, the second PDSCH, and the third PDSCH or a PDSCH based on a TTI length having a length of 1 ms in a TTI for transmitting a predetermined uplink control channel.

The PUCCH may be linked to a CCE (control channel element) index of a PDCCH (physical downlink control channel) that schedules PDSCH based on a shorter TTI length among a length of the first TTI and a length of the second TTI. Or, the PUCCH can be determined by the CCE index.

Or, the PUCCH may be indicated by a PDCCH that schedules PDSCH based on a shorter TTI length among the length of the first TTI and the length of the second TTI among a plurality of predetermined PUCCHs.

When a TTI for transmitting an uplink control channel for the first PDSCH is overlapped with a TTI for transmitting an uplink control channel for the second PDSCH, uplink control information for the first PDSCH and the second PDSCH may be transmitted by one selected from the group consisting of a channel selection method, a new PUCCH format, and bundling.

When hopping of the PUCCH is not allowed within a TTI corresponding to the shorter TTI length, the UE may receive a configuration on whether or not the repetitive transmission of the PUCCH is allowed from the eNB. When the repetitive transmission of the PUCCH is allowed, the UE may receive configuration information including at least one selected from the group consisting of a TTI in which a repetition part of the PUCCH is transmitted, a TTI section during which the repetition part of the PUCCH is transmitted, an uplink resource in which the repetition part of the PUCCH is transmitted, and criteria for determining the uplink resource in which the repetition part of the PUCCH is transmitted from the eNB.

In the foregoing description, embodiments of the present invention have been briefly explained with reference to FIG. 10. An embodiment related to FIG. 10 can alternatively or additionally include at least a part of the aforementioned embodiments.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Figure 11:
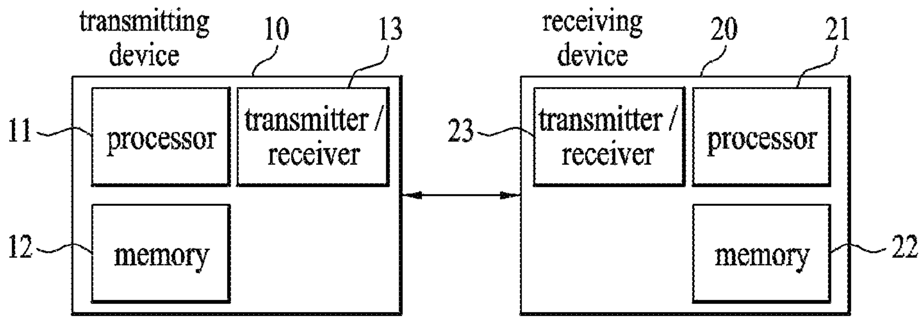
FIG. 11 is a block diagram of a device for implementing embodiment(s) of the present invention.

FIG. 11 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting.

The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method of transmitting an uplink control channel by a terminal in a wireless communication system, the method comprising:

receiving a first physical downlink shared channel (PDSCH) based on a first transmission time interval (TTI) length;

receiving a second PDSCH based on a second TTI length different from the first TTI length; and transmitting a first hybrid automatic repeat request acknowledgment (HARQ-ACK) feedback for the first PDSCH and a second HARQ-ACK feedback for the second PDSCH, wherein, when a time for transmission of the first HARQ-ACK feedback and a time for transmission of the second HARQ-ACK feedback overlap in a time domain, the first HARQ-ACK feedback and the second HARQ-ACK feedback are transmitted on a physical uplink control channel (PUCCH) with the first TTI length or the second TTI length, whichever is the shorter TTI length.

2. The method of claim 1, further comprising:

receiving a first physical downlink control channel (PDCCH) that schedules the first PDSCH based on the first TTI length; and receiving a second PDCCH that schedules the second PDSCH based on the second TTI length, wherein, when the time for transmission of the first HARQ-ACK feedback and the time for transmission of the second HARQ-ACK feedback overlap in the time domain, a resource of the PUCCH is determined based on the first PDCCH or the second PDCCH, whichever schedules a PDSCH based on the shorter TTI length.

3. The method of claim 1, wherein, when the time for transmission of the first HARQ-ACK feedback and the time for transmission of the second HARQ-ACK feedback overlap in the time domain, the first HARQ-ACK feedback and the second HARQ-ACK feedback are transmitted on the PUCCH by using HARQ-ACK bundling.

4. The method of claim 3, wherein the HARQ-ACK bundling is performed for HARQ-ACKs for codewords based on the first TTI length.

5. The method of claim 3, wherein the HARQ-ACK bundling is performed for HARQ-ACKs for codewords based on the second TTI length.

6. The method of claim 1, further comprising:

receiving a third PDSCH based on a third TTI length different from the first and second TTI lengths; and transmitting a third HARQ-ACK for the third PDSCH, wherein, when the time for transmission of the first HARQ-ACK feedback, the time for transmission of the second HARQ-ACK feedback and a time for transmission of the third HARQ-ACK feedback overlap in the time domain, the first HARQ-ACK feedback, the second HARQ-ACK feedback and the third HARQ-ACK feedback are transmitted on a PUCCH with the first TTI length, the second TTI length or the third TTI length, whichever is the shortest TTI length.

7. An apparatus for controlling transmission of an uplink control channel in wireless communication system, the apparatus comprising:

a processor; and a memory that is operably connectable to the processor and that has stored thereon instructions which, when executed, cause the processor to perform operations comprising:

controlling a receiver to receive a first physical downlink shared channel (PDSCH) based on a first transmission time interval (TTI) length;

controlling the receiver to receive a second PDSCH based on a second TTI length different from the first TTI length; and controlling a transmitter to transmit a first hybrid automatic repeat request acknowledgment (HARQ-ACK) feedback for the first PDSCH and a second HARQ-ACK feedback for the second PDSCH, wherein when a time for transmission of the first HARQ-ACK feedback and a time for transmission of the second HARQ-ACK feedback overlap in a time domain, the first HARQ-ACK feedback and the second HARQ-ACK feedback are transmitted on a physical uplink control channel (PUCCH) with the first TTI length or the second TTI length, whichever is the shorter TTI length.

8. The apparatus of claim 7, wherein the operations further comprise:

controlling the receiver to receive a first physical downlink control channel (PDCCH) that schedules the first PDSCH based on the first TTI length; and controlling the receiver to receive a second PDCCH that schedules the second PDSCH based on the second TTI length, wherein, when the time for transmission of the first HARQ-ACK feedback and the time for transmission of the second HARQ-ACK feedback, a resource of the PUCCH is determined based on the first PDCCH or the second PDCCH, whichever schedules a PDSCH based on the shorter TTI length.

9. The apparatus of claim 7, wherein the operations further comprise:

when the time for transmission of the first HARQ-ACK feedback and the time for transmission of the second HARQ-ACK feedback overlap in the time domain, the first HARQ-ACK feedback and the second HARQ-ACK feedback are transmitted on the PUCCH by using HARQ-ACK bundling.

10. The apparatus of claim 9, wherein the HARQ-ACK bundling is performed for HARQ-ACKs for codewords based on the first TTI length.

11. The apparatus of claim 9, wherein the HARQ-ACK bundling is performed for HARQ-ACKs for codewords based on the second TTI length.

12. The apparatus of claim 7, wherein the operations further comprise:

controlling the receiver to receive a third PDSCH based on a third TTI length different from the first and second TTI lengths; and controlling the transceiver to transmit a third HARQ-ACK for the third PDSCH, wherein, when the time for transmission of the first HARQ-ACK feedback, the time for transmission of the second HARQ-ACK feedback and a time for transmission of the third HARQ-ACK feedback overlap in the time domain, the first HARQ-ACK feedback, the second HARQ-ACK feedback and the third HARQ-ACK feedback are transmitted on a PUCCH with the first TTI length, the second TTI length or the third TTI length, whichever is the shortest TTI length.

13. The apparatus of claim 7, wherein the receiver and the transmitter are a receiver of a terminal and a transmitter of the terminal, respectively, to which the apparatus is operatively connectable.

14. A method of receiving an uplink control channel by a base station in a wireless communication system, the method comprising:

transmitting a first physical downlink shared channel (PDSCH) based on a first transmission time interval (TTI) length to a terminal;

transmitting a second PDSCH based on a second TTI length different from the first TTI length to the terminal; and receiving a first hybrid automatic repeat request acknowledgment (HARQ-ACK) feedback for the first PDSCH and a second HARQ-ACK feedback for the second PDSCH from the terminal, wherein, when a time for transmission of the first HARQ-ACK feedback and a time for transmission of the second HARQ-ACK feedback overlap in a time domain, the first HARQ-ACK feedback and the second HARQ-ACK feedback are received on a physical uplink control channel (PUCCH) with the first TTI length or the second TTI length, whichever is the shorter TTI length.

15. The method of claim 14, further comprising:

transmitting a first physical downlink control channel (PDCCH) that schedules the first PDSCH based on the first TTI length to the terminal; and transmitting a second PDCCH that schedules the second PDSCH based on the second TTI length to the terminal, wherein, when the time for transmission of the first HARQ-ACK feedback and the time for transmission of the second HARQ-ACK feedback overlap in the time domain, a resource of the PUCCH is determined based on the first PDCCH or the second PDCCH, whichever schedules a PDSCH based on the shorter TTI length.

16. The method of claim 14, wherein, when the time for transmission of the first HARQ-ACK feedback and the time for transmission of the second HARQ-ACK feedback overlap in the time domain, the PUCCH carries HARQ-ACK bits for the first HARQ-ACK feedback and the second HARQ-ACK feedback by using HARQ-ACK bundling.

17. The method of claim 16, wherein at least one of the HARQ-ACK bits is a bundled HARQ-ACK bit for codewords based on the first TTI length.

18. The method of claim 16, wherein at least one of the HARQ-ACK bits is a bundled HARQ-ACK for codewords based on the second TTI length.

19. The method of claim 14, further comprising:

transmitting a third PDSCH based on a third TTI length different from the first and second TTI lengths, to the terminal; and receiving a third HARQ-ACK for the third PDSCH to the terminal, wherein, when the time for transmission of the first HARQ-ACK feedback, the time for transmission of the second HARQ-ACK feedback and a time for transmission of the third HARQ-ACK feedback overlap in the time domain, the first HARQ-ACK feedback, the second HARQ-ACK feedback and the third HARQ-ACK feedback are received on a PUCCH with the first TTI length, the second TTI length or the third TTI length, whichever is the shortest TTI length.

* * * * *